(12) United States Patent
Niikura

(10) Patent No.: US 7,114,805 B2
(45) Date of Patent: Oct. 3, 2006

(54) RECORDING APPARATUS

(75) Inventor: Takeji Niikura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1020 days.

(21) Appl. No.: 10/026,703

(22) Filed: Dec. 27, 2001

(65) Prior Publication Data

US 2002/0085239 A1 Jul. 4, 2002

(30) Foreign Application Priority Data

Dec. 27, 2000 (JP) .............................. 2000-398074

(51) Int. Cl.
*B41J 29/13* (2006.01)
(52) U.S. Cl. ...................................... 347/108; 400/691
(58) Field of Classification Search ................ 347/108, 347/691, 352, 35

See application file for complete search history.

(56) References Cited

U.S. PATENT DOCUMENTS

| | | | | |
|---|---|---|---|---|
| 2,483,843 A | * | 10/1949 | Prezioso | 400/691 |
| 5,529,411 A | * | 6/1996 | Nakata | 400/322 |
| 6,379,064 B1 | * | 4/2002 | Giles et al. | 400/691 |
| 6,394,672 B1 | * | 5/2002 | Murray et al. | 400/58 |
| 6,834,950 B1 | * | 12/2004 | Hugle | 347/108 |

* cited by examiner

*Primary Examiner*—Stephen Meier
*Assistant Examiner*—Ly Tran
(74) *Attorney, Agent, or Firm*—Fitzpatrick, Cella, Harper & Scinto

(57) ABSTRACT

A recording apparatus for effecting recording on a recording material using a recording head, includes a part for effecting a recording operation, and a supporting member supporting the part. The supporting member has two bent portions for supporting opposite end portions of the part and a cut and bent portion between the two bent portions.

21 Claims, 6 Drawing Sheets

RECORDING APPARATUS

FIELD OF THE INVENTION AND RELATED ART

The present invention relates to a recording apparatus such as a facsimile machine, a copying machine, and the like. In particular, it relates to the internal chassis structure of a recording apparatus.

A recording apparatus which has the function of a printer, a copying machine, a facsimile machine, or the like, or a recording apparatus which is used as an output device for a compound electronic device or a work station, which includes a computer, a word processor, and the like, is structured so that it records an image on recording medium, for example, paper, thin plastic plate, or the like, based on image formation data. The recording apparatuses of the above described type can be divided into several groups according to their recording methods; for example, ink jet group, wire dot group, thermal group, laser beam group, and the like.

In the past, a recording apparatus such as the above described ones was made up of a plurality of functional components involved in a recording operation, and a chassis which supports the functional components. Further, the chassis was an assembly of a plurality of components. In the case of such a recording apparatus, the increases in component cost and assembly cost were inevitable.

As one of the attempts for dealing with such cost increases, the chassis was made by simply bending a monolithic piece of plate, which has been formed, by blanking, in the predetermined pattern. The simple bending of the plate resulted in a substantial number of L-shaped corners, which were not rigid enough to withstand the load from functional components. In other words, a conventional monolithic chassis was not strong enough to satisfactorily support the functional components. In addition, it failed to provide an image forming apparatus with torsional rigidity, making it difficult to improve the performance of an image forming apparatus.

With the presence of the above described background, it was customary that a high-end image forming apparatus aimed essentially at image formation performance was given a chassis made up of a plurality of components, and a low-end image forming apparatus aimed essentially at low cost was given a monolithic chassis.

SUMMARY OF THE INVENTION

The primary object of the present invention is to solve the problems of the above described prior art, that is, to reduce the chassis cost, while improving the chassis at the portions for supporting the components involved in a recording operation, by simplifying the chassis structure by reducing component count, so that it becomes possible to provide a recording apparatus superior in image formation performance to an image forming apparatus based on the prior art.

Another object of the present invention is to provide a recording apparatus, in which the components related to the recording operation of the apparatus are supported by the component supporting portions formed by bending the predetermined portions of the supporting member (chassis), and the component supporting portions of the supporting member (chassis) are connected to the portions of the supporting member other than the component supporting portions of the supporting member (chassis).

Another object of the present invention is to provide a recording apparatus with an improved image formation performance, by improving the portions of the chassis of the recording apparatus, formed by bending the predetermined portions of the chassis in order to support the components related to the recording operation, in rigidity, in terms of the direction in which the component supporting portions are bent when they are formed, so that the components related to the recording operation are supported at a higher level of accuracy.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinafter, the preferred embodiments of the present invention will be described with reference to the appended drawings. Here, a recording apparatus in accordance with the present invention is described with reference to an inkjet recording apparatus. However, the application of the present invention is not limited to an inkjet recording apparatus. Rather, the present invention is also applicable, with good results, to various recording apparatuses other than an inkjet recording apparatus; for example, a wire dot type recording apparatus, a thermal transfer type recording apparatus, a laser beam type recording apparatus, and the like. Further, although recording medium is described with reference to a recording paper, the application of the present invention is not limited to a recording apparatus which records on recording paper. Rather, the present invention is also applicable to a recording apparatus which records on recording medium other than recording paper. In other words, the present invention is applicable to any recording apparatus which records on recording medium, preferably in the form of a sheet, capable of retaining ink, toner, or the like, on its surface.

(Embodiment 1)

Figure 1:
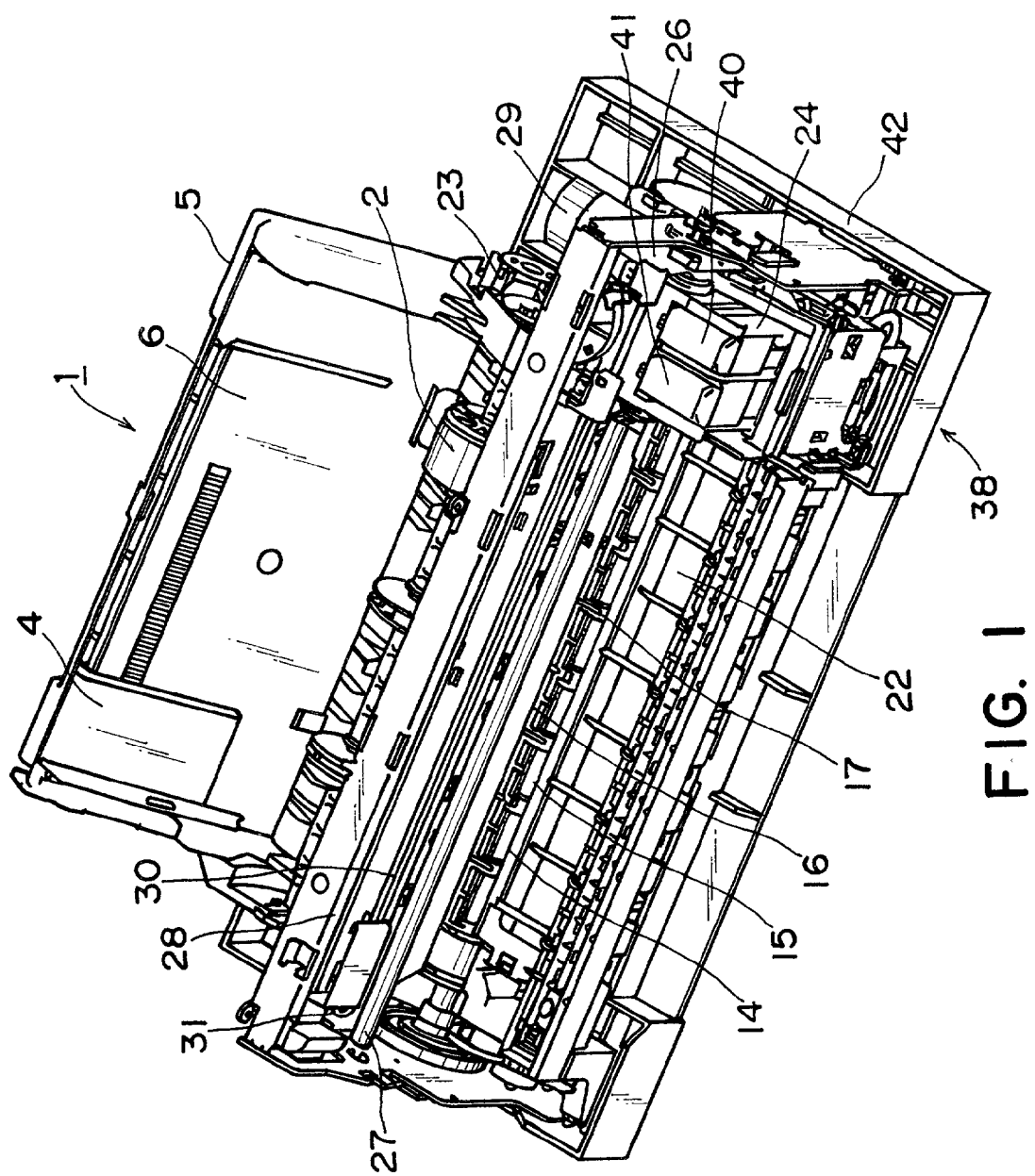
FIG. 1 is a perspective view of a recording apparatus to which the present invention is preferably applicable, and shows the general structure thereof.
Figure 2:
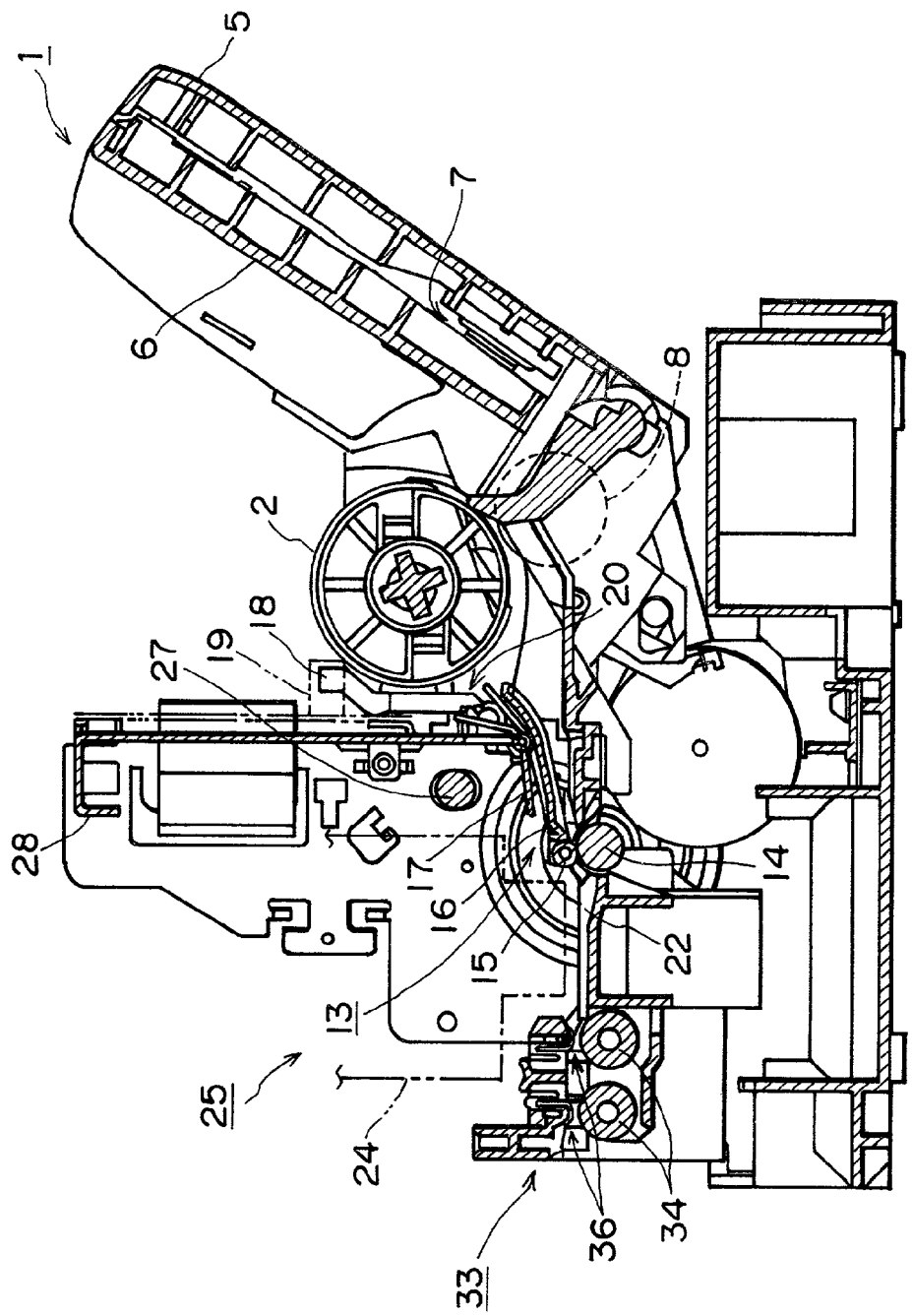
FIG. 2 is a sectional view of the recording apparatus in a preferable embodiment of the present invention, and shows the general structure thereof.

Before beginning to describe the chassis structure in accordance with the present invention, the general structure of an inkjet recording apparatus compatible with the chassis structure in accordance with the present invention will be described referring to FIGS. 1 and 2. FIG. 1 is a perspective view of an inkjet recording apparatus, as seen from above the right front corner of the apparatus, to which the present invention is preferably applicable. In the drawing, the top cover of the apparatus has been removed. FIG. 2 is a sectional view of the essential portions of the inkjet recording apparatus, to which the present invention is preferably applicable.

The inkjet recording apparatus in this embodiment is provided with an automatic sheet feeder (which sometimes is referred to as "ASF"), which is an integral part of the apparatus. As shown in FIGS. 1 and 2, it is also provided with a sheet feeding portion 1, a sheet conveying portion 13, a sheet discharging portion 33, a carriage portion 25, a cleaning portion 38, and the like. The sheet feeding portion 1 is attached to the image forming apparatus main assembly, being tilted at an angle in a range of 30°–60° relative to the general direction in which recording medium is conveyed, whereas the apparatus main assembly is structured so that a plurality of recording sheets P loaded in the sheet feeding portion 1 are horizontally discharged from the apparatus main assembly after recording. The sheet feeding portion 1 comprises a sheet feeding roller 2, a pair of movable side guides 4, a frame 5, a pressure plate 6, a pressure plate spring 7, a driving force transmission gear train 23, and the like. The pressure plate 6 is reciprocally moved in the direction perpendicular to the pressure plate 6 by a cam connected to the gear train 23, to press, or stop pressing, the recording sheet P (unshown) upon the sheet feeding roller 2, so that the recording sheets P are picked up and butted against a retarding roller 8, by the sheet feeding roller 2, which is being rotated. The retarding roller 8 contains a torque limiter, and allows the recording sheets P to pass the retarding roller 8 only one by one, separating each recording sheet P from the following one. Then, each recording sheet P is sent to the sheet conveying portion 13, which will be described later. The sheet feeding roller 2 and aforementioned cam are rotated once to deliver each recording sheet P to the sheet conveying portion 13. Upon arrival of each recording sheet P, the transmission of driving force to the sheet feeding roller 2 and cam is stopped as soon as the pressure plate 6 stops pressing the recording medium P upon the sheet feeding roller 2, and then, the sheet feeding portion 1 is kept on standby in this state (initial state).

The sheet conveying portion 13 comprises a conveyer roller 14, a pinch roller 15, a pair of pinch roller guides 16, a pair of pinch roller springs 17, a sheet end sensor (PE sensor) 19, a PE sensor lever 18, a PE sensor spring 20, a platen 22, and the like. Upon arriving at the sheet conveying portion 13, the recording sheet P is guided to the nip between the conveyer roller 14 and pinch roller 15 by the platen 22 and pinch roller guides 16. On the upstream side of the combination of the conveyer roller 14 and pinch roller 15, the PE sensor lever 18 is located, which detects the arrival of the leading end of the recording sheet P, that is, the referential point for determining where on the recording medium P an image is to be started. The pinch roller 15 is kept pressed upon the conveyer roller 14 by keeping the pinch roller guides 16 pressured by the pinch roller springs 17. It is rotated by the rotation of the conveyer roller 14 to generate the force for conveying the recording sheet P. Upon arriving of each recording sheet P at the nip between the conveyer roller 14 and pinch roller 15, an LF motor 9 (unshown) is driven to rotate the conveyer roller 14 and pinch roller 15 until the recording sheet P is conveyed on the platen 22 by a predetermined distance so that the recording starting point on the recording sheet P coincides with the predetermined recording starting point on the platen 22. Then, an image in accordance with predetermined image formation data is recorded by a recording head 24.

The recording head is positioned above the platen 22 so that it virtually contacts the recording sheet P having been delivered to the predetermined point on the platen 22 by the conveyer roller 14 and pinch roller 15, and ejects ink onto the recording sheet P to form an image on the recording sheet P. As for a recording means, this recording apparatus is provided with a recording head 24 of an inkjet type, which records an image by ejecting ink (ink droplets) from its ink ejection orifices. This recording head 24 is provided with a plurality of microscopic liquid ejection orifices, a plurality of liquid paths with an energy transducing portion, and a plurality of energy generating portions disposed one for one in the energy transducing portions of the plurality of liquid paths to generate liquid droplet formation energy which is made to act upon the liquid in the energy transducing portion.

As for a recording method which employs an energy generating means for generating such energy (energy for ejecting ink (ink droplets) from the ink ejection orifices), there are a method which employs an electromechanical transducer such as a piezoelectric element, a recording method which employs an electromagnetic wave generating means such as a laser for heating liquid so that liquid is ejected in the form of a liquid droplet, a recording method which employs an electrothermal transducer such as a heat generating element for heating liquid so that liquid is ejected in the form of a liquid droplet, and the like methods.

Among the energy generating means described above, the one which produces thermal energy to eject liquid makes it possible to arrange at a high density a plurality of liquid ejection orifices, from which recording liquid is ejected in the form of a liquid droplet, in a single recording head, making therefore it possible to record a high resolution image. In particular, an inkjet recording head which employs an electrothermal transducer as the energy generating means is superior for the following reasons: it is easily compacted; it is remarkably compatible with the merits of the technologies in the semiconductor field, for example, the IC technologies and micro-processing technologies, which have made an enormous amount of progress in the recent years; it can be mounted in high density; and it is low in manufacturing cost.

The carriage portion 25 comprises: a carriage 26 as a means on which the recording head 24 is mounted; a guide shaft 27 for reciprocally moving the carriage 26 in the direction (primary scan direction) intersectant (for example, perpendicular) with the sheet conveyance direction (secondary scan direction), in a manner to scan the recording sheet P; a guide rail 28 which slidably supports the carriage 26 by a predetermined portion of the carriage 26, and maintains, together with the guide shaft 27, the distance between the recording head 24 and recording sheet P; a timing belt 30 for transmitting the driving force from a carriage motor 29 to the carriage 26; an idler pulley 31 for providing the timing belt 30 with tension; a flexible electrical cable (unshown) for transmitting head driving signals to the recording head 24 from an electrical circuit (unshown); and the like. The recording head 24 is independent from ink containers 40 and 41, allowing the ink containers to be replaced. It is mounted on the carriage 26, and therefore, it is moved with the carriage 26 in a manner to scan the recording sheet P being conveyed on the platen 22, while ejecting ink in response to recording signals, as the carriage 26 is moved in a manner to scan the recording sheet P. As a result, an image is formed on the recording medium P by the ink ejected from the recording head 24.

The sheet discharging portion 33 comprises: a pair of sheet discharge rollers 34; a gear train (unshown) for transmitting driving force to the sheet discharge rollers 34 from the sheet conveying roller 14; a spurring roller (roller which is provided with a plurality of sharp projections projecting from the peripheral surface of the roller, and is rotated by the rotation of the sheet discharge rollers) for assisting the sheet discharging functions of the sheet discharge rollers 34; a delivery tray (unshown), and the like. With the provision of the spurring roller 36 which works in coordination with the sheet discharge rollers 34, the recording sheet P is discharged into the delivery tray (unshown), without being smeared across its image recorded surface, after the image recording.

The cleaning portion 38 comprises: a tube-type pump (unshown) for cleaning the recording head 24; a cap (unshown) for preventing the liquid ejection orifices of the recording head 24 from drying; a gear train (unshown) for transmitting driving force from the sheet conveying roller 14 to the pump (unshown), and the like. The gear train (unshown) of the cleaning portion 38 is controlled by a switching means of the cleaning portion 38, so that the driving force from the sheet conveying roller 14 is not transmitted to the tube-type pump, except for during the cleaning period.

As the LF motor (unshown) for driving the sheet conveying roller 14 and the like, a stepping motor which rotates a predetermined angle in response to a signal sent from an unshown driver is employed. In comparison, the carriage motor 29 for driving the carriage 26 is a DC motor, so that the carriage position can be controlled by a linear encoder; the slit of a carriage position determining scale correspondent to the current carriage position is fed back.

With the provision of the above described structure, the recording apparatus main assembly is enabled to carry out an image formation sequence comprising the sheet feeding, image printing, sheet discharging, and also to protect the recording head 24.

Next, referring to FIGS. 3 and 4, the structure of the chassis of the recording apparatus in this embodiment of the present invention will be described. A chassis 100 (metallic frame) is formed of metallic plate such as zinc plated steel plate. It is structured so that it can be inexpensively mass-produced from a roll of metallic plate by sequential pressing. The thickness t of the metallic plate for the recording apparatus chassis is normally 1.0 mm 2.0 mm.

A section 100A, or the main section of the chassis 100, is provided with a pair of frame attachment holes 100a and 100b for attaching the frame 5 of the sheet conveying portion 1 to the chassis 100. Right and left lateral plates 100B and 100C formed by cutting and raising upright the predetermined portions of the major section 100A are provided with roller attachment holes 100c and 100d, one for one, for rotationally supporting the sheet conveying roller 14, with the interposition of a pair of bearings, one for one.

The major section 100A is also provided with six pinch roller supporting portions 100e (six different locations) for rotationally supporting the pinch roller guide 16, and a section 100g, which is formed also by perpendicularly bending the predetermined portion of the top side of the major section 100A, and to which one end of the pinch roller spring 17, which is a helical torsion spring, is anchored. The other end of the pinch roller spring 17 is placed in contact with the pinch roller guide 16, at a point close to the pinch roller 15, keeping the pinch roller 15 pressed upon the sheet conveying roller 14.

The corner between the major section 100A and a section 100F formed by perpendicularly bending the predetermined portions of the bottom side of the major section 100A is provided with four pinch roller spring supporting portions 100f (four different locations) for supporting the coiled portion of the pinch roller spring 17. The section 100F is for preventing the major section 100A from being deformed by the load which is placed on the sections 100g by the pinch roller springs 17, one end of each of which is anchored to the corresponding section 100g.

The right and left sections 100B and 100C, or the lateral plates raised upright from the major section 100A are also provided with holes 100h and 100i, respectively, for supporting the guide shaft 27. The guide shaft 27 is attached to the chassis 100, without the presence of any play, by placing the slotted ends of the guide shaft 27 through the guide shaft attachment holes 100h and 100i, and keeping the slotted ends pressed by the spring shafts, one for one.

The top portion of the major section 100A is provided with a section 100H, which constitutes a guide rail 28, and was formed by bending the major section 100A so that the resultant section, or the section 100H, was given a U-shaped cross section. The top portion of the carriage 26 is placed in contact with the back side of the rail section 100G of the guide rail 28, being enabled to slide in the primary scan direction of the carriage 26.

The farthest ends of the left lateral plate 100C and section 100I with reference to the major section 100A are provided with supporting portion 100j and 100k, respectively, for supporting the downstream side of the platen 22. Not only is the platen 22 supported by the supporting portions 100j and 100k, by the downstream side, but also, it fits around the peripheral surface of the sheet conveying roller 14 by the upstream side. As a result, a proper distance is set and maintained between the ink ejecting side of the recording head 24 on the carriage 26, and the top surface of the platen 22.

The bottom portion of the major section 100A is bent, forming a section 100D, so that the chassis 100 can be securely fixed to the external frame (which is designated by a referential code 42 in FIG. 1) of the recording apparatus, by the section 100D. The section 100D is provided with a pair of positioning holes 100n and 100o, into which the positioning projections of the aforementioned external frame are placed to properly position the chassis 100 relative to the external frame, and a pair of small screw holes 100p and 100q for securely fixing the chassis 100 to the external frame. Further, the farthest ends of the right and left lateral plates 100B and 100C with respect to the major section 100A are provided with small projections 100l and 100m, respectively, which engage with predetermined portions of the external frame. In other words, the chassis 100 is properly positioned on the chassis seat portion of the external frame by the positioning holes 100n and 100o, and the small projections 100l and 100m engaged with the predetermined portions of the external frame. Then, small screws are put through the small screw holes 100p and 100q and screwed into the external frame. As a result, the chassis 100 is properly fixed to the external frame of the recording apparatus.

In order to improve the process for forming the above described functional portions of the chassis 100, and also to increase the rigidity of the chassis 100, the top end of the left lateral plate 100B, which is formed by cutting and raising upright the predetermined portion of the major section 100A as described above, is attached by crimping to the end of the section 100H, which also is formed by bending the predetermined portion of the major section 100A. This results in the formation of the crimped portion 100r at the joint between the sections 100B and 100H. Further, the right lateral section 100B is provided with a section 100B', which is formed by bending the predetermined bottom portion of the right lateral plate 100B, in a manner to partially overlap with the aforementioned section 100D, which is formed by bending the predetermined bottom portion of the major section 100A. This section 100B is fixed to the section 100D by a small screw screwed into the small screw hole loot of the section 100D.

Similarly, the top end of the left lateral plate 100C is attached by crimping to the section H, forming a crimped portion 100s. Further, the left lateral section 100C is provided with a section 100C', which is formed by bending the predetermined bottom portion of the left lateral plate 100C, in a manner to partially overlap with the aforementioned section 100D, which is formed by bending the predetermined bottom portion of the major section 100A. This section 100C is fixed to the section 100D by a small screw screwed into the small screw hole 100u of the section 100D. It should be noted here that a crimping process can be carried out at the same time as a bending process is done, and therefore, the addition of the above described crimping processes does not increase the cost of the chassis 100.

Regarding the section 100D which constitutes the substantial portion of the bottom section of the chassis 100, in order to keep the chassis 100 stable when attaching the sheet feeding portion 1 to the chassis 100, the section 100D is bent rearward of the recording apparatus. Therefore, if the design of the chassis 100 is such that the section 100D is to be attached to the other sections of the chassis 100 by crimping, a crimping process independent from the sequential pressing processes must be added. This is the reason for using small screws for connecting the section 100D with the other sections of the chassis 100, as described above.

Figure 3:
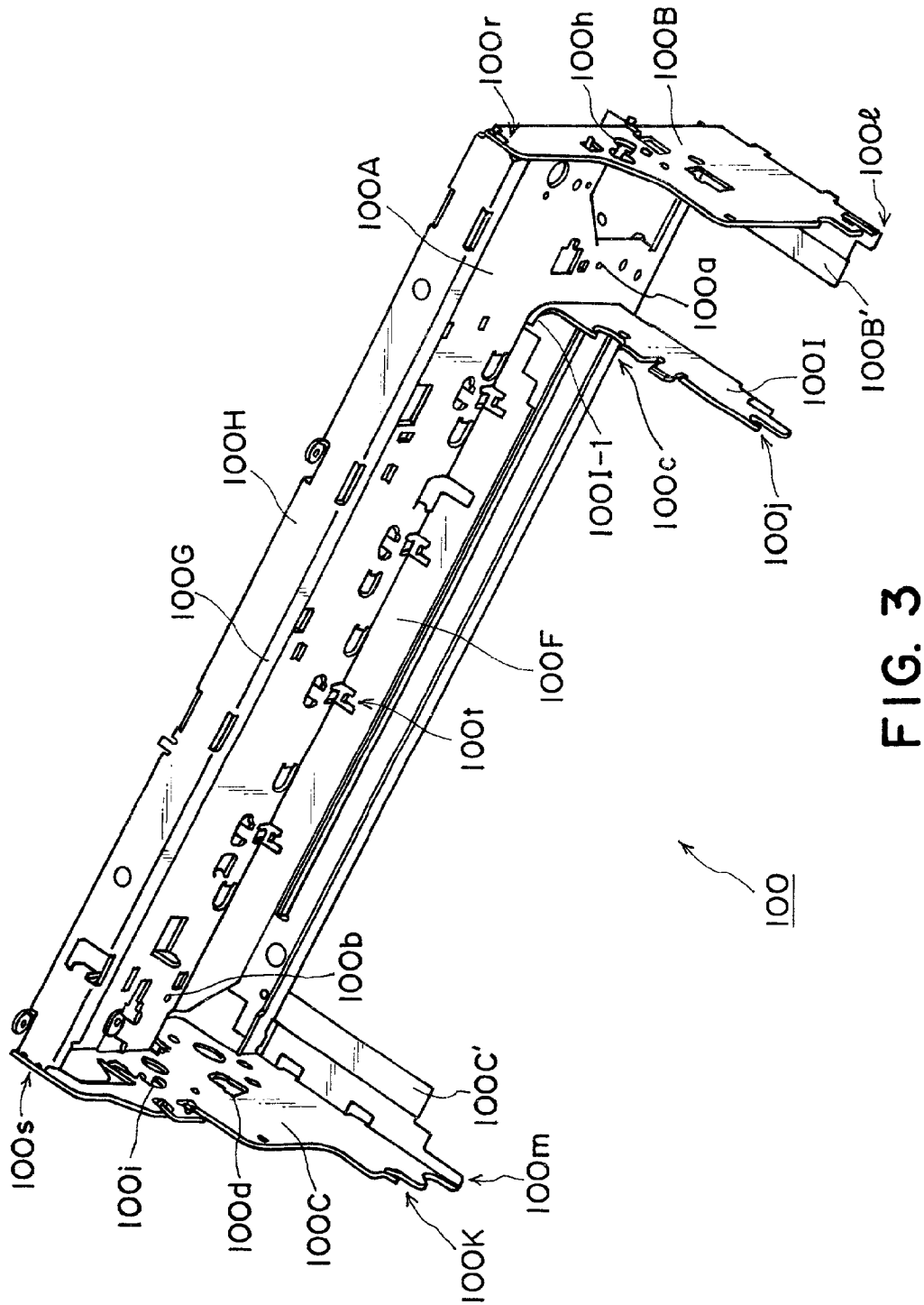
FIG. 3 is a perspective view of the chassis of the recording apparatus, as seen from diagonally above one of the front corners of the recording apparatus, in the first embodiment of the present invention, and shows the general structure thereof.
Figure 4:
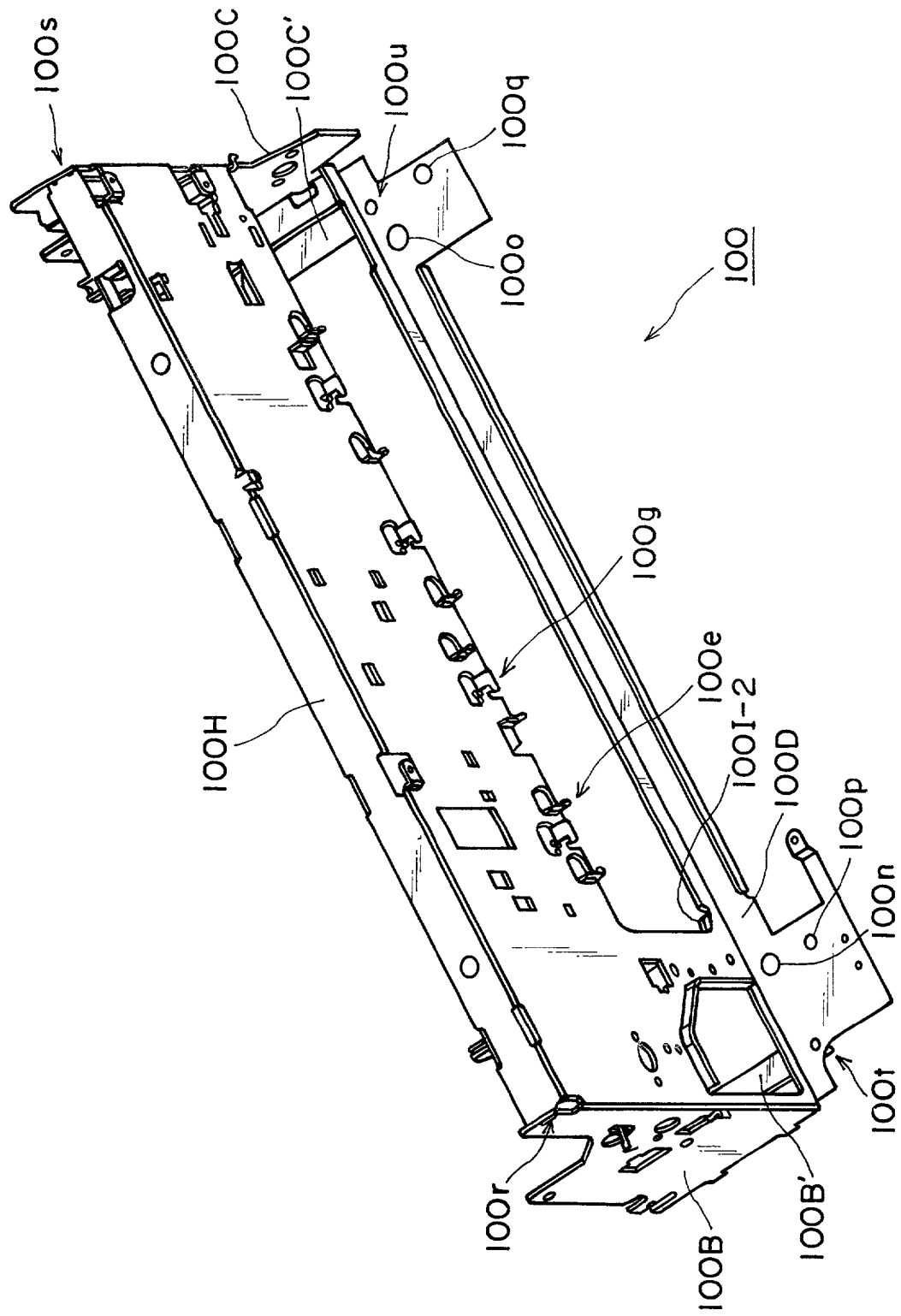
FIG. 4 is a perspective view of the chassis of the recording apparatus, as seen from diagonally above one of the rear corners of the recording apparatus, in the first embodiment of the present invention, and shows the general structure thereof.

Referring to FIGS. 3 and 4, the transitional portions between the section 100F, and section 100I for supporting the one end of the sheet conveying roller 14 (secondary scanning means), that is, the base portion of the section 100I, is provided with crimped portions 100I-1 and 100I-2, which are formed by crimping the opposing edge portions of the aforementioned transitional portions, and are virtually perpendicular to the section 100I. This provision of the crimped portions 100I-1 and 100I-2 increases the rigidity of the section 100I against the force which works in the direction to deform the section 100I at its base portion, providing therefore the section 100I, which is an integral part of a monolithic chassis 100, with a level of rigidity equal to the level of rigidity provided only by forming a component equivalent to the section 100I, independently from the major section 100A of the chassis 100.

According to the above described structural design of the metallic chassis 100 as one of the major structural components of the recording apparatus, the essential sections of the chassis 100 for supporting the members (for example, guide shaft 27, guide rail 28, sheet conveying roller 14, pinch roller guide 16, and the like, in FIGS. 1 and 2) of the scanning means, are connected to the sections of the chassis 100 other than the essential sections of the chassis 100, resulting in the formation of the chassis 100 virtually in the form of a box. Therefore, in spite of the simplicity of the design, the chassis 100 is provided with a high level of rigidity which the chassis 100 needs as the major structural component of the recording apparatus. Therefore, it is possible to improve the recording apparatus in the level of accuracy and the speed, at which the recording sheet P is conveyed, in the level of accuracy and the speed, at which the carried is moved, as well as other aspects of the image recording performance, for example, the noise level. In addition, the metallic chassis 100 for supporting the various components of the scanning means is formed by bending a single piece of metallic plate, making it possible to accomplish a reduction in component cost as well as assembly cost.

Further, the transitional bend portion (for example, section 100I in FIG. 3) between a major section and a sub-section, that is, the base portion of a sub-section, which is formed as the predetermined portion of the major section is bent to form the subsection, and is difficult to connect to any of the other sections of the chassis, is provided with a pair of sections which are virtually perpendicular to the sub-section. Therefore, the rigidity of the base portion of the sub-section is greater than that in accordance with the prior art, in terms of the rigidity against the force which works in the direction to deform the sub-section. Moreover, synergetic effects, in terms of chassis rigidity, can be expected from the combination of the manner in which the major section is connected to the adjacent sub-sections, and the manner in which the transitional portion between the major section and the sub-section is provided with these sections perpendicular to the transitional portion.

(Embodiment 2)

Next, referring to FIG. 5, the second embodiment of the present invention will be described. However, the second embodiment will be described regarding only its difference from the first embodiment.

Figure 5:
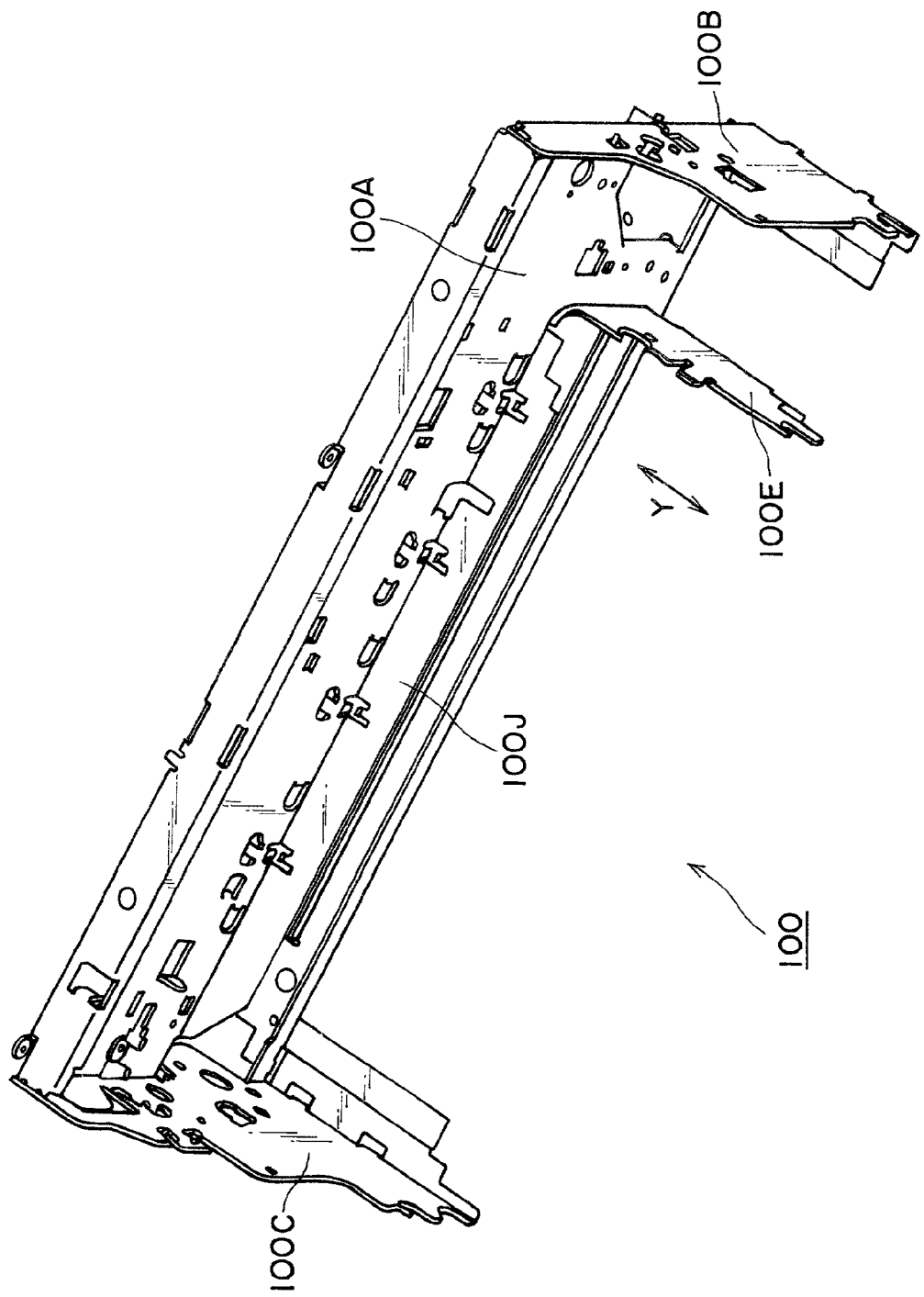
FIG. 5 is a perspective view of the chassis of the recording apparatus, as seen from diagonally above one of the front corners of the recording apparatus, in the second embodiment of the present invention, and shows the general structure thereof.

FIG. 5 is a perspective view of the chassis of the recording apparatus in this embodiment, and shows the structure of the chassis as FIG. 3 shows the chassis in the first embodiment. In FIG. 5, the sections 100E provided with a sheet conveying roller attachment hole, and a section 100J, are formed, as two continuous portions of a section formed by cutting and raising upright a part of the major section 100A, while crimping the continuous portion. To describe it with reference to FIG. 3, the sections 100E and 100J in this embodiment correspond to the sections 100F and 100I. However, the section 100E in this embodiment, which corresponds to the section 100F in the first embodiment, is continuous with the section 100J in this embodiment, which corresponds to the section 100I in the first embodiment, in the range which corresponds to the section 100I-1 in the first embodiment.

Compared to the structural design of the chassis in the first embodiment, this structural design of the chassis 100 makes a chassis blank slightly more difficult to sequentially press. However, this design further increases the strength of the transitional portion between the section 100E and 100J against the force which works in the direction indicated by an arrow mark Y in FIG. 5.

Thus, the second embodiment can accomplish cost reduction as well as improvement in the image recording performance.

(Embodiment 3)

In the first and second embodiment, the bottom section 100D of the chassis 100, by which the chassis 100 is attached to the external frame 42 of the recording apparatus, is formed by bending the predetermined bottom portion of a piece of metallic plate in the rearward direction of the recording apparatus (FIGS. 1 and 4). In comparison, in this embodiment, the bottom section 100D is formed by bending the predetermined bottom portion of a piece of metallic plate in the frontward direction of the recording apparatus. Also in case of this embodiment, only the difference of this embodiment from the first and second embodiments will be described.

Figure 6:
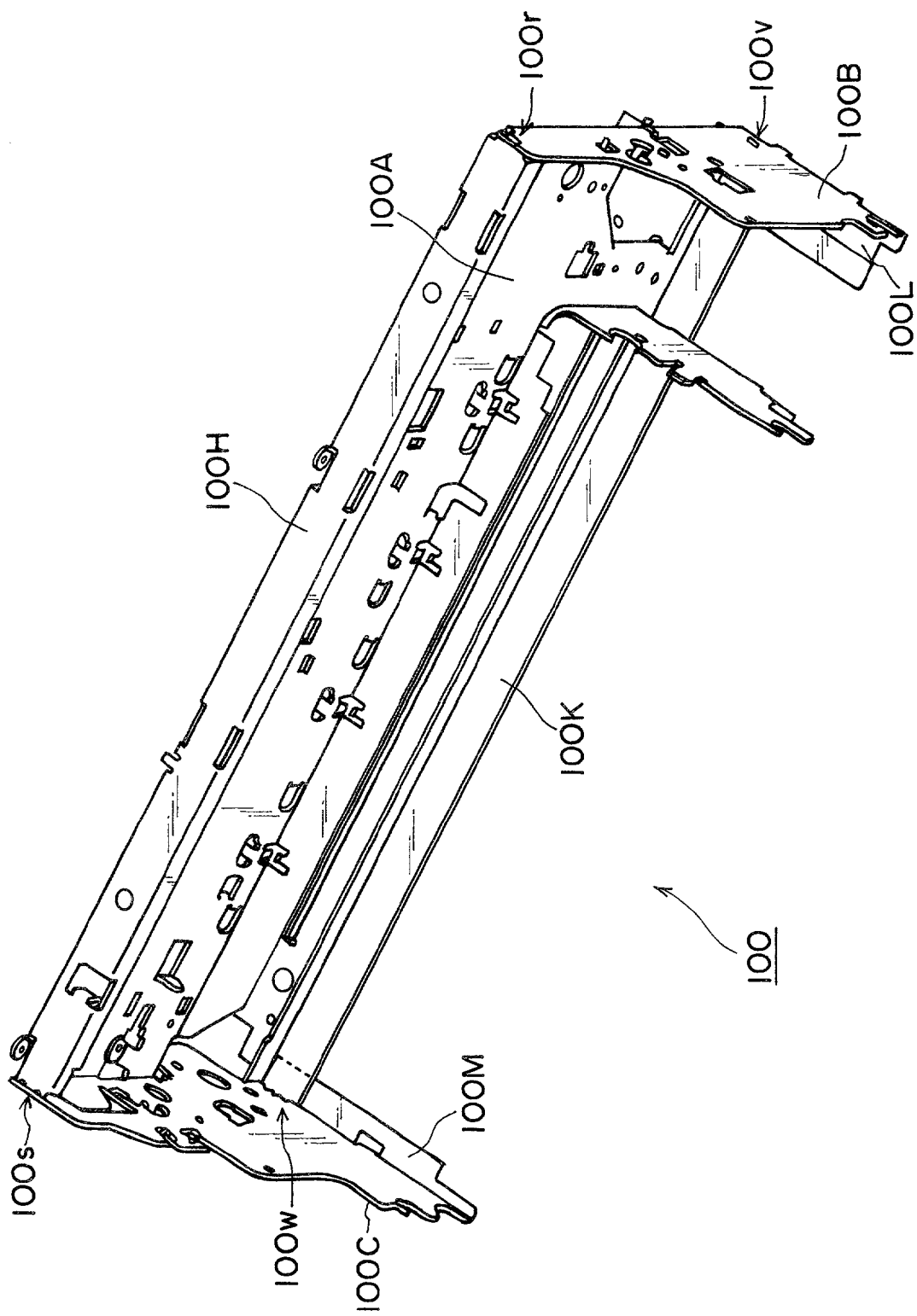
FIG. 6 is a perspective view of the chassis of the recording apparatus, as seen from diagonally above one of the rear corners of the recording apparatus, in the third embodiment of the present invention, and shows the general structure thereof.

Referring to FIG. 6, a section 100K, which is formed by bending the predetermined bottom portion of the major section 100A, in the frontward direction of the recording apparatus, is connected by crimping, to the right and left lateral plate 100B and 100C, forming crimped portions 100v and 100w, in the same manner as the section 100H, in FIGS. 3 and 4, which constitutes the guide rail 28, is attached to the right and left lateral plate 100B and 100C. Therefore, the chassis 100 is given an intact box shape, becoming more rigid than the chassis 100 in the first and second embodiments. Further, sections 100L and 100M, or the bottom portions of the left and right lateral plates 100B and 100C, respectively, are bent in a manner to overlap with the section 100K after the crimped portions 100v and 100w are formed by connecting, by crimping, the section 100K to the left and right lateral plate 100B, further increasing the rigidity of the chassis 100.

The structural design of the chassis 100 in this embodiment can improve the image recording performance of the recording apparatus, while accomplishing the cost reduction of the recording apparatus.

(Miscellaneous Embodiments)

In the above described first to third embodiments, the means for connecting the sections of the chassis, which are formed by bending a single piece of metallic plate, was described with reference to crimping, screwing, or the like means. However, the compatibility of the present invention is not limited to crimping and screwing. Obviously, the present invention is also compatible with connecting means other than crimping and screwing; for example, spot welding, burning/crimping, and the like.

Further, in each of the preceding embodiments, the recording apparatus compatible with the present invention was described with reference to a serial type recording apparatus equipped with a carriage on which a recording head is mounted, and which makes serial movement. However, the compatibility of the present invention is not limited to the chassis structure of the serial type recording apparatus. Obviously, the present invention is also compatible with a so-called full-line type recording apparatus, the recording head of which is equipped with a single or plurality of rows of ejection orifices, the lengths of which match the entire width of the recording medium.

As described above regarding each of the preceding embodiments, according to the present invention, the various components of a recording apparatus, related to the recording operation, are supported by the sections of the chassis formed by bending a single piece of metallic plate, and these component supporting sections are connected to the portions of the chassis other than the component supporting sections. Therefore, the component supporting sections formed by bending are more rigid in terms of the direction in which they otherwise tend to collapse. Thus, it is possible for the components related to the recording operation to be supported with a higher level of accuracy, improving therefore image formation performance of the apparatus. In addition, component count is reduced while reinforcing the sections formed by bending for supporting the components related to the recording operation. Therefore, cost is reduced as well.

Each section of the chassis for supporting a single or plural components related to the recording operation is formed by cutting a single piece of metallic plate along predetermined lines, and bending upright the portion surrounded by the cut lines, so that the base portion of the component supporting section of the chassis will be provided with a single or pair of sections perpendicular to the component supporting section. Therefore, the base portion of the component supporting section formed by cutting and bending is more rigid than otherwise, in terms of the direction in which the section would otherwise fall, further improving the image recording performance of the recording apparatus.

Further, of the plurality of chassis sections which are for supporting the components for scanning means, and are formed by cutting and bending upright the various sections of a single piece of metallic plate, those which require a higher level of rigidity, are connected to the chassis sections other than the scanning means component supporting chassis sections, resulting in the formation of the chassis virtually in the form of a box, improving therefore the recording apparatus in structural rigidity, which in turn improves the recording apparatus in the level of accuracy and the speed, at which the recording sheet P is conveyed, in the level of accuracy and the speed, at which the carried is moved, as well as in other aspects of the image recording performance, for example, the noise level. In addition, the member for supporting the various components of the scanning means is formed of a single piece of metallic plate, making it possible to accomplish a reduction in component cost as well as assembly cost.

It is desired that the base portion of the chassis section cut and raised upright for supporting one end of the sheet conveying roller, which constitutes a part of the secondary scanning means, is crimped along the opposing edges, so that the base portion will be provided with a single or plurality of sections perpendicular to the cut and uprighted sheet conveying roller supporting section, in order to improve the rigidity of the base portion in terms of the direction in which the sheet conveying roller supporting section would otherwise fall.

Further, the supporting member is provided with a section, formed by cutting and raising upright the predetermined portion of the supporting member, for supporting one end of the sheet conveying roller constituting a part of the secondary scanning means. It is also provided with a section, formed also by cutting and raising upright the predetermined portion of the supporting member, for supporting the pinch roller constituting another part of the secondary scanning means, and involved in the sub-structure for keeping the pinch roller pressed upon the sheet conveying roller. In addition, these uprighted supporting sections are formed continuous to each other, improving the strength of each of the uprighted supporting sections against the force which acts in the direction parallel thereto, as well as the force which acts in the direction perpendicular thereto.

While the invention has been described with reference to the structures disclosed herein, it is not confined to the details set forth and this application is intended to cover such modifications or changes as may come within the purposes of the improvements or the scope of the following claims.

What is claimed is:

1. A recording apparatus for effecting recording on a recording material using a recording head, said apparatus comprising:
   a first part for effecting a recording operation;
   a second part for effecting a recording operation;
   a supporting member supporting said first part, said supporting member having two bent portions for supporting opposite end portions of said first part, and a cut and bent portion disposed between said two bent portions,
   wherein one end of said second part is supported by one of said bent portions, and another end of said second part is supported by said cut and bent portion.

2. An apparatus according to claim 1, wherein a base portion of said cut and bent portion has a portion extending in a direction crossing with a direction in which said cut and bent portion extends.

3. An apparatus according to claim 1 or 2, wherein said recording head is an ink jet recording head for ejecting ink through an ink ejection outlet.

4. An apparatus according to claim 3, wherein said ink jet recording head is a head for ejecting ink using thermal energy generated by an electrothermal transducer.

5. A recording apparatus for effecting recording on a recording material using recording means, said apparatus comprising:
   a reciprocable main-scanning mechanism for scanningly moving said recording means;
   a sub-scanning mechanism for feeding the recording material in a direction crossing with the scanning direction of said recording means; and
   a supporting member supporting a structural part forming part of said main-scanning mechanism and said sub-scanning mechanism, said supporting member including an integral metal plate material and having a bent portion which is locked with another portion of said metal plate material,
   wherein the bent portion is provided at each of opposite ends portions of said supporting member to support opposite end portions of a guiding shaft of said main scanning mechanism, and said supporting member further includes a cut and bent portion disposed between the opposite end portions of the guiding shaft, for supporting an end portion of a feeding roller of said sub-scanning mechanism.

6. An apparatus according to claim 5, wherein said bent portion and locked portion form a guiding rail portion of said main-scanning mechanism formed by bending an upper end portion of the metal plate material.

7. An apparatus according to claim 5, wherein said bent portion and said locked portion are a part of said supporting member opposed to a guiding rail portion of said main-scanning mechanism and interpose a feeding path for the recording sheet therebetween.

8. An apparatus according to claim 7, wherein said opposed portion is a bent surface, formed by bending a lower end portion of said metal plate material frontwardly or rearwardly, for being fixed on an outer casing base of said recording apparatus.

9. An apparatus according to claim 7, wherein said supporting member has a bent surface for supporting an end of a feeding roller of said sub-scanning mechanism, and a bent surface for supporting a pinch roller of said sub-scanning mechanism and associated with urging of said pinch roller toward said feeding roller, and said bent surfaces are continuous.

10. An apparatus according to claim 5, wherein a base portion of said cut and bent portion is formed by deep drawing.

11. An apparatus according to claim 10, wherein said base portion has a portion extending in a direction crossing with said cut and bent portion.

12. An apparatus according to claim 5, wherein said recording means is an ink jet recording head for ejecting ink through an ink ejection outlet.

13. An apparatus according to claim 12, wherein said ink jet recording head is a head for ejecting ink using thermal energy generated by an electrothermal transducer.

14. A recording apparatus for effecting recording on a recording material using recording means, said apparatus comprising:
   a reciprocable main-scanning mechanism for scanningly moving said recording means;
   a sub-scanning mechanism for feeding the recording material in a direction crossing with the scanning direction of said recording means;
   a supporting member supporting parts of said main-scanning mechanism and said sub-scanning mechanism, said supporting member formed of one an integral metal plate material and having two bent portions for supporting each end of said main-scanning mechanism and a cut and bent surface disposed between said bent portions, wherein a base portion of said cut and bent surface is formed by deep drawing.

15. An apparatus according to claim 14, wherein said base portion has a portion extending in a direction crossing with a direction in which said cut and bent surface is extended.

16. An apparatus according to claim 14 or 15, wherein said cut and bent surface is a supporting surface for supporting an end of a feeding roller of said sub-scanning mechanism.

17. An apparatus according to claim 14, wherein said recording means is an ink jet recording head for ejecting ink through an ink ejection outlet.

18. An apparatus according to claim 17, wherein said ink jet recording head is a head for ejecting ink using thermal energy generated by an electrothermal transducer.

19. A recording apparatus for effecting recording on a recording material using recording means, said apparatus comprising:
   a reciprocable main-scanning mechanism for scanningly moving said recording means;
   a sub-scanning mechanism for feeding the recording material in a direction crossing with the scanning direction of said recording means; and
   a supporting member supporting parts of said main-scanning mechanism and said sub-scanning mechanism, said supporting member formed of an integral metal plate material and having a bent surface supporting an end of a feeding roller of said sub-scanning mechanism, a cut and bent surface supporting another end of said feeding roller, and a bent surface for supporting a pinch roller of said sub-scanning mechanism and associated with urging of said pinch roller toward said feeding roller, and said bent surfaces are continuous.

20. An apparatus according to claim 19, wherein said recording means is an ink jet recording head for ejecting ink through an ink ejection outlet.

21. An apparatus according to claim 20, wherein said ink jet recording head is a head for ejecting ink using thermal energy generated by an electrothermal transducer.

* * * * *

UNITED STATES PATENT AND TRADEMARK OFFICE
CERTIFICATE OF CORRECTION

PATENT NO. : 7,114,805 B2  
APPLICATION NO. : 10/026703  
DATED : October 3, 2006  
INVENTOR(S) : Takeji Niikura It is certified that error appears in the above-identified patent and that said Letters Patent is hereby corrected as shown below:

COLUMN 9:

Line 44, "burning/crimping," should read --burring/crimping,--.

COLUMN 11:

Line 40, "ends" should read --end--.

COLUMN 12:

Line 22, "one an" should read --an--.

Signed and Sealed this

Twenty-seventh Day of May, 2008

JON W. DUDAS  
*Director of the United States Patent and Trademark Office*